United States Patent
Dey et al.

(10) Patent No.: US 8,948,812 B2
(45) Date of Patent: Feb. 3, 2015

(54) CAMERA APPARATUS

(71) Applicant: FrameBlast Limited, London (GB)

(72) Inventors: Aaron Dey, London (GB); Steven Allen, London (GB)

(73) Assignee: Frameblast Limited, London (GB)

( * ) Notice: Subject to any disclaimer, the term of this patent is extended or adjusted under 35 U.S.C. 154(b) by 239 days.

(21) Appl. No.: 13/705,088

(22) Filed: Dec. 4, 2012

(65) Prior Publication Data

US 2014/0094220 A1  Apr. 3, 2014

(30) Foreign Application Priority Data

Sep. 28, 2012  (GB) .................................. 1217339.9

(51) Int. Cl.
| | |
|---|---|
| *H04N 1/00* | (2006.01) |
| *H04M 1/02* | (2006.01) |
| *H04N 5/225* | (2006.01) |
| *H04N 7/14* | (2006.01) |

(52) U.S. Cl.
CPC ........... *H04M 1/0264* (2013.01); *H04N 5/2251* (2013.01); *H04N 5/2252* (2013.01); *H04N 2007/145* (2013.01)
USPC .................... 455/556.1; 455/90.3; 455/575.1; 348/14.02

(58) Field of Classification Search
USPC ............ 455/550.1, 552.1, 556.1, 575.1, 90.3; 348/14.02
See application file for complete search history.

(56) References Cited

U.S. PATENT DOCUMENTS

| | | | | |
|---|---|---|---|---|
| 6,876,379 | B1* | 4/2005 | Fisher ........................ | 348/14.02 |
| 7,460,882 | B2* | 12/2008 | Silverbrook ............... | 455/550.1 |
| 7,969,503 | B2* | 6/2011 | Sladen .......................... | 348/371 |
| 8,423,085 | B2* | 4/2013 | Nakajima et al. ............ | 455/566 |
| 2006/0240873 | A1 | 10/2006 | Cho | |
| 2010/0167786 | A1* | 7/2010 | Silverbrook et al. ...... | 455/556.1 |

FOREIGN PATENT DOCUMENTS

| | | |
|---|---|---|
| EP | 1775918 A2 | 4/2007 |
| JP | 11-177917 H | 7/1999 |
| WO | 03088147 A1 | 10/2003 |

* cited by examiner

*Primary Examiner* — Nhan Le
(74) *Attorney, Agent, or Firm* — Ziegler IP Law Group, LLC.

(57) ABSTRACT

A wireless communication device (10) incorporates computing hardware (20) coupled to a data memory (30), to a wireless communication interface (50) for communicating data from and to the wireless communication device (10), to a graphical user interface (40) for receiving user input, and to an optical imaging sensor (60) for receiving captured image data therefrom. The computing hardware (10) executes software applications (200) for enabling the optical imaging sensor (60) to capture images, and for storing corresponding image data in the data memory (30) and/or for communicating the corresponding image data from the wireless communication device (10) via its wireless communication interface (50). The wireless communication device (10) has an elongate external enclosure having a longest dimension (L) defining a direction of a corresponding elongate axis (110) for the wireless communication device (10).

19 Claims, 11 Drawing Sheets d)

e)

f)

CAMERA APPARATUS

FIELD OF THE INVENTION

The present invention relates to camera apparatus implemented using mobile wireless devices, for example using smart wireless telephones and/or tablet computers, equipped with at least one optical imaging sensor. Moreover, the invention is also concerned with methods of implementing a camera apparatus using a mobile wireless device, for example a smart wireless telephone and/or a tablet computer, equipped with at least one optical imaging sensor. Furthermore, the present invention relates to software products, for example mobile telephone application software and/or tablet computer application software, stored on machine-readable data storage media, wherein the software products are executable upon computing hardware for implementing aforesaid methods on a mobile wireless device.

BACKGROUND OF THE INVENTION

Mobile wireless communication devices, for example cell phones, namely referred to as "mobile telephones" in Europe, first came into widespread use during the 1980's. These earlier wireless communication devices provided relatively simple user interfaces including a keyboard for dialling, and a simple display to provide visual confirmation of dialled numbers as well as simple messages, for example short messaging system (SMS) communications. Since the 1980's, mobile wireless communication devices have evolved to become more physically compact, and to be equipped with more processing power and larger capacity data memory. Contemporary mobile communication devices are distinguished from personal computers (PCs) by being of a relatively smaller physical size, such that contemporary mobile communication devices fit conveniently into a jacket pocket or a small handbag, for example the devices are in an order of 10 cm long, 5 cm broad and 1 cm thick.

In comparison to early mobile wireless communication devices, for example cell phones which first became popular in the 1980's, contemporary mobile wireless communication devices, for example "smart phones" from companies such as Nokia, Apple Corp. and Samsung, have become computationally so powerful that diverse software applications, known as "Apps", can be downloaded via wireless communication to the contemporary devices for execution thereupon. Conveniently, the Apps are stored on an external database, for example known as an "App store". Users of contemporary wireless communication devices are, for example, able to download various Apps from the App store in return for paying a fee. When executed upon computing hardware of the contemporary wireless communication devices, the Apps are capable of communicating data back and forth between the mobile wireless communication devices and other such devices and/or external databases.

In addition to being provided with greater computational power and more data memory capacity, contemporary cell phones have also tended to include various inbuilt sensors, for example at least one miniature camera, an accelerometer, a GPS receiver, a temperature sensor, a touch screen, in addition to a microphone and a loudspeaker required for oral telephonic activities. Example implementations of contemporary smart phones are described in published patent applications as provided in Table 1.

TABLE 1

Known contemporary mobile wireless communication devices

| Patent application no. | Title |
|---|---|
| WO2012/088939A1 | "Mobile phone and camera method thereof" Huizhou TCL Mobile Communication Co. Ltd.) |
| WO2011/082332A1 | "Methods and arrangements employing sensor-equipped phones" (Digimarc Corp.) |

A problem encountered with known contemporary mobile communication devices is that they are not optimally configured for capturing video content, for example in manner which is convenient to communicate via wireless communication networks offering modest communication bandwidth and to store in limited data memory capacity of the devices. It is known that capturing video content is susceptible to generate large video data files. Although methods of data compression for video content are known, these methods do not properly address a manner in which the video content is generated.

In the aforesaid published international POT patent application no. WO2011/082332A1, there are described improvements to smart phones and related sensor-equipped systems. There are elucidated improvements, for example a user can assist a smart phone in identifying what portion of imagery captured by a smart phone camera should be processed, or identifying what type of image processing should be executed.

In the aforesaid published international POT patent application no. WO2102/088939A1, there is described a cell phone and a processing method for use in the cell phone. The cell phone includes;
(i) a directional detection module for determining whether or not a shooting direction of the cell phone is vertical; and
(ii) an image processing module for receiving an direction indicative signal from the direction detection module.
The image processing module rotates an image acquired by a camera of the cell telephone when the shooting direction is vertical. By application of the aforesaid method, the image is rotated directly inside the cell phone, thereby avoiding a need for the user to upload the image into a computer and then to rotate the image by 90° manually.

SUMMARY OF THE INVENTION

The present invention seeks to provide a camera apparatus, for example implemented using a contemporary cell phone or tablet computer, which provides for more convenient capture of video content in a form which is readily susceptible to being communicated by wireless.

Moreover, the present invention seeks to provide a method of capturing video content which is more convenient for users, for example when using a contemporary cell phone or tablet computer.

Furthermore, the present invention seeks to provide a software application which is executable upon computing hardware of a contemporary cell phone or tablet computer for adapting the cell phone technically to function in a manner which is more convenient for capturing video content.

According to a first aspect of the present invention, there is provided a camera apparatus as defined in appended claim 1: there is provided a camera apparatus including a wireless communication device incorporating computing hardware coupled to a data memory, to a wireless communication interface for communicating data from and to the wireless communication device, to a graphical user interface for receiving user input, and to an optical imaging sensor for receiving captured image data therefrom, wherein the computing hardware is operable to execute one or more software applications for enabling the optical imaging sensor to capture one or more images, and for storing corresponding image data in the data memory and/or for communicating the corresponding image data from the wireless communication device via its wireless communication interface, wherein the wireless communication device has an elongate external enclosure having a longest dimension (L) defining a direction of a corresponding elongate axis for the wireless communication device, and wherein:

(a) the one or more software applications are operable to enable the wireless communication device to capture images when the wireless communication device is operated by its user such that the elongate axis is orientated in substantially an upward direction, wherein the one or more software applications are operable to cause the computing hardware to select sub-portions of captured images provided from the optical imaging sensor and to generate corresponding rotated versions of the selected sub-portions to generate image data for storing in the data memory and/or for communicating via the wireless communication interface; and (b) the one or more software applications are operable to enable the wireless communication device to capture the one or more images as one or more video clips in response to the user providing tactile input at an active region the graphical user interface, wherein each video clip is of short duration (D) and is a self-contained temporal sequence of images.

The invention is of advantage in that the camera apparatus is more convenient to employ on account of its substantially vertical operating orientation and its manner of operation to generate self-contained video clips of convenient duration (D) for subsequent processing.

By "substantially vertical", it is meant that the elongate axis is within 45° of vertical direction, more preferably is within 30° of vertical direction, and most preferably is within 20° of vertical direction.

Optionally, for the camera apparatus, the short duration (D) is in a range of 1 second to 20 seconds, more preferable in a range of 1 second to 10 seconds, and most preferable substantially 3 seconds.

Optionally, for the camera apparatus, the wireless communication device includes a sensor arrangement for sensing an angular orientation of the elongate axis of the wireless communication device and generating a corresponding angle indicative signal, and the one or more software applications are operable to cause the computing hardware to receive the angle indicative signal and to rotate the sub-portions of the captured images so that they appear when viewed to be upright and stable images.

Optionally, for the camera apparatus, the one or more software applications are operable when executed upon the computing hardware to present one or more icons representative of video clips upon the graphical user interface, and one or more icons representative of sorting bins into which the one or more icons representative of video clips are susceptible to being sorted, wherein sorting of the one or more icons representative of video clips into the one or more icons representative of sorting bins is invoked by a user swiping motion executed by a thumb or finger of the user on the user graphical interface, wherein a given icon representative of a corresponding video clip is defined at a beginning of the swiping motion and a destination sorting bin for the selected icon representative of a corresponding video clip is defined at an end of the swiping motion.

Optionally, for the camera apparatus, the one or more software applications executing upon the computing hardware are operable to cause the one or more icons representative of video clips upon the graphical user interface to be sorted to be presented in a scrollable array along a longest length dimension of the graphical user interface.

More optionally, for the camera apparatus, the one or more software applications executing upon the computing hardware are operable to cause the one or more icons representative of video dips upon the graphical user interface to be sorted to be presented in a spatial arrangement indicative of a time at which the video clips were captured by the optical imaging sensor.

More optionally, for the camera apparatus, at least one of the one or more icons representative of sorting bins, into which the one or more icons representative of video clips are susceptible to being sorted, is a trash bin, wherein the computing hardware is operable is present the user with a graphical representation option for emptying the trash bin to cause data stored in the data memory corresponding to contents of the trash bin to be deleted for freeing data memory capacity of the data memory.

Optionally, for the camera apparatus, the one or more software applications are operable when executed upon the computing hardware to enable the wireless communication device to upload one or more video clips from the data memory to one or more remote proxy servers and to manipulate the one or more video clips uploaded to the one or more proxy servers via user instructions entered via the user graphical interface.

According to a second aspect of the invention, there is provided a method of implementing a camera apparatus using a wireless communication device incorporating computing hardware coupled to a data memory, to a wireless communication interface for communicating data from and to the wireless communication device, to a graphical user interface for receiving user input, and to an optical imaging sensor for receiving captured image data therefrom, wherein the computing hardware is operable to execute one or more software applications for enabling the optical imaging sensor to capture one or more images, and for storing corresponding image data in the data memory and/or for communicating the corresponding image data from the wireless communication device via its wireless communication interface, wherein the wireless communication device has an elongate external enclosure having a longest dimension (L) defining a direction of a corresponding elongate axis for the wireless communication device, wherein the method further includes;

(a) employing the one or more software applications to enable the wireless communication device to capture images when the wireless communication device is operated by its user such that the elongate axis is orientated in substantially an upward direction, wherein the one or more software applications are employed to cause the computing hardware to select sub-portions of captured images provided from the optical imaging sensor and to generate corresponding rotated versions of the selected sub-portions to generate image data for storing in the data memory and/or for communicating via the wireless communication interface; and (b) employing the one or more software applications to enable the wireless communication device to capture the one or more images as one or more video clips in response to the user providing tactile input at an active region the graphical user interface, wherein each video clip is of short duration (D) and is a self-contained temporal sequence of images.

By "substantially vertical", it is meant that the elongate axis is within 45° of vertical direction, more preferably is within 30° of vertical direction, and most preferably is within 20° of vertical direction.

Optionally, for the method, the short duration (0) is in a range of 1 second to 20 seconds, more preferable in a range of 1 second to 10 seconds, and most preferable substantially 3 seconds. Other durations are optionally possible for the short duration (D).

Optionally, the method includes using a sensor arrangement of the wireless communication device for sensing an angular orientation of the elongate axis of the wireless communication device and generating a corresponding angle indicative signal, and employing the one or more software applications to cause the computing hardware to receive the angle indicative signal and to rotate the sub-portions of the captured images so that they appear when viewed to be upright and stable images.

Optionally, the method includes employing the one or more software applications when executed upon the computing hardware to present one or more icons representative of video clips upon the graphical user interface, and one or more icons representative of sorting bins into which the one or more icons representative of video clips are susceptible to being sorted, wherein sorting of the one or more icons representative of video clips into the one or more icons representative of sorting bins is invoked by a user swiping motion executed by a thumb or finger of the user on the user graphical interface, wherein a given icon representative of a corresponding video clip is defined at a beginning of the swiping motion and a destination sorting bin for the selected icon representative of a corresponding video clip is defined at an end of the swiping motion.

More optionally, the method includes employing the one or more software applications executing upon the computing hardware to cause the one or more icons representative of video clips upon the graphical user interface to be sorted to be presented in a scrollable array along a longest length dimension of the graphical user interface.

More optionally, the method includes employing the one or more software applications executing upon the computing hardware to cause the one or more icons representative of video clips upon the graphical user interface to be sorted to be presented in a spatial arrangement indicative of a time at which the video clips were captured by the optical imaging sensor.

More optionally, the method includes employing the one or more software applications to cause the at least one of the one or more icons representative of sorting bins, into which the one or more icons representative of video clips are susceptible to being sorted, to be a trash bin, wherein the computing hardware is operable is present the user with a graphical representation option for emptying the trash bin to cause data stored in the data memory corresponding to contents of the trash bin to be deleted for freeing data memory capacity of the data memory.

Optionally, the method includes employing the one or more software applications when executed upon the computing hardware to enable the wireless communication device to upload one or more video clips from the data memory to one or more remote proxy servers and to manipulate the one or more video cups uploaded to the one or more proxy servers via user instructions entered via the user graphical interface.

According to a third aspect of the invention, there is provided a software product recorded on machine-readable data storage media, wherein the software product is executable upon computing hardware for implementing a method pursuant to the second aspect of the invention.

Optionally, the software product is downloadable from an App store to a wireless communication device including the computing hardware.

It will be appreciated that features of the invention are susceptible to being combined in various combinations without departing from the scope of the invention as defined by the appended claims.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

Figure 1:
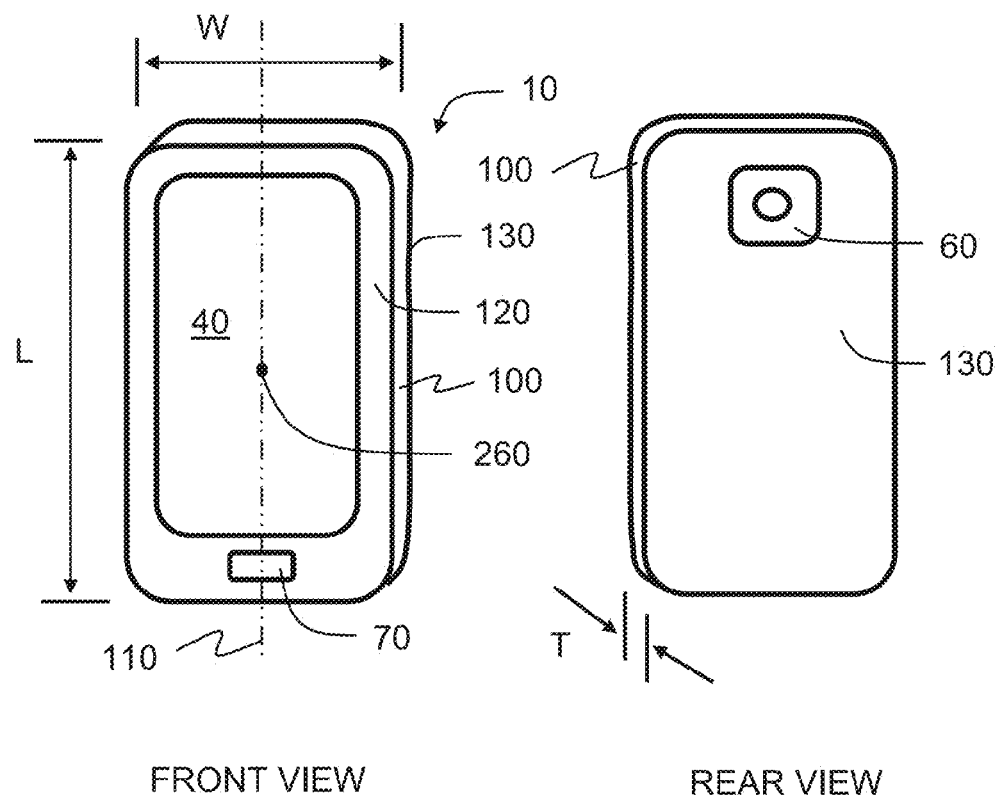
FIG. 1 is an illustration of a conventional contemporary cell phone or tablet computer employed to capture still images and video content.
Figure 2:
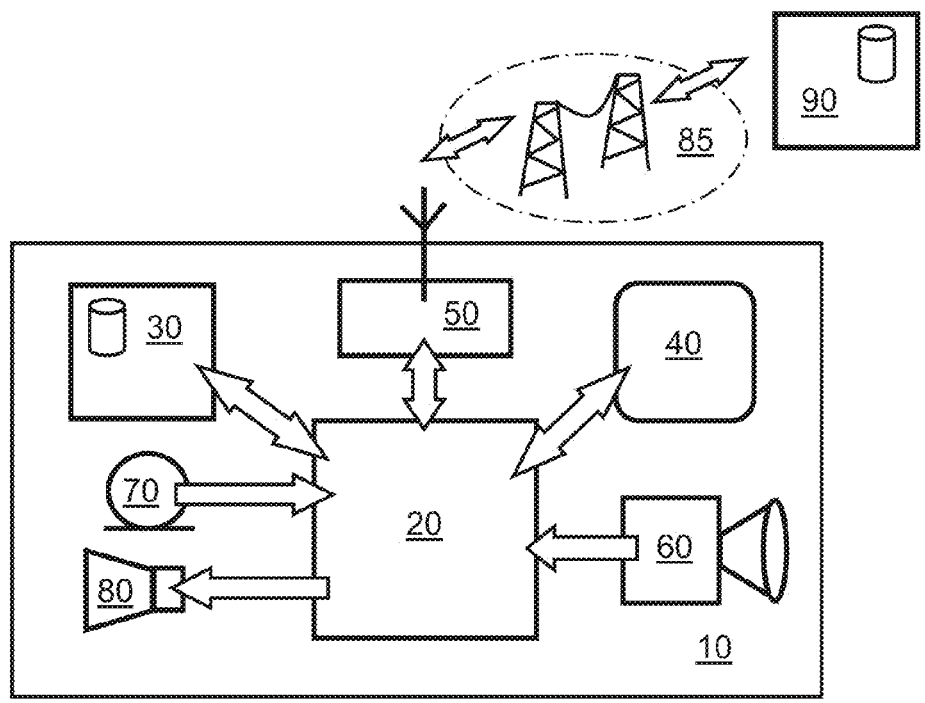
FIG. 2 is an illustration of a contemporary cell phone or tablet computer, and active elements included within the contemporary cell phone or tablet computer.

Referring to FIG. 1 and FIG. 2, the present invention will be described in association with a wireless communication device indicated by 10. The device 10 is, for example a compact contemporary smart phone or tablet computer. Moreover, the device 10 includes computing hardware 20 coupled to a data memory 30, a touch-screen graphical user interface 40, a wireless communication interface 50, an optical pixel array sensor 60, and a microphone 70 and associated speaker 80 for user oral communication. The wireless communication device 10 is operable to communicate via a cellular wireless telephone network or WiFi connection to the Internet denoted by 85. Moreover, the computing hardware 20 and its associated data memory 30 are of sufficient computing power to execute software applications, namely "Apps", downloaded to the wireless communication device from an external database 90, for example from an "App store".

The wireless communication device 10 includes an exterior casing 100 which is compact and generally elongate in form, namely having a physical dimension to its spatial extent which is longer along an elongate axis 110 than its other physical dimensions; for example, the exterior casing 100 has a length L along the elongate axis 110 which is greater than its width W, and also greater than its thickness T. Moreover, in such contemporary wireless communication devices, it is customary for the device 10 to have substantially mutually parallel front and rear major planar surfaces 120, 130 respectively, wherein the touch-screen graphical user interface 40 is implemented in respect of the front major planar surface 120 and the optical pixel array sensor 60 is implemented in respect of the rear major planar surface 130. Such an implementation enables the device 10 to be employed for oral dialogue, namely conversations, when the users are in a standing state and the elongate axis 110 is orientated in a substantially vertical manner. However, it is contemporary design practice for the device 10 to be rotated by 90° when the device 10 is to be employed in its camera mode; in such a camera mode, a user holds the device 40 at its elongate ends with both user hands, such that the elongate axis 110 is substantially horizontal, and the optical pixel array sensor 60, is orientated typically away from the user towards a scene of interest whilst the touch-screen graphical user interface 40 presents to the user in real time a view as observed from the optical pixel array sensor 60. The user then depresses a region of the touch-screen graphical user interface 40 to capture an image as observed from the optical pixel array sensor 60 and stores it as a corresponding still image data in the data memory 30, for example in JPEG or similar contemporary coding format. Similarly, the user is alternatively able to depresses a region of the touch-screen graphical user interface 40 to capture a sequence of video images as observed from the optical pixel array sensor 60 and store it as corresponding video content data in the data memory 30, for example in MPEG or similar contemporary coding format; the user depresses a region of the touch-screen graphical user interface 40 to terminate capture of the sequence of video images. Subsequently, the user can elect to communicate via wireless the still image data and/or video content data to other users, or onto an external database, for example a "cloud" database residing in the Internet, for archival purposes or for further processing. Such further processing is performed, for example, using video editing software executable upon laptop or desktop personal computers (PCs) which are connectable to the Internet, for example to download data from the "cloud" database.

It is found by the inventors of the present invention that such a manner of operation of the device 10 is awkward and results in unprofessional video content generation. Moreover, the video content data can be potentially unwieldy in size which renders it costly and time consuming to communicate from the device 10 onto one or more external databases. Moreover, subsequent editing the video content data can be time consuming, requiring a PC to be activated into operation, and video content editing software invoked. Although awkward to implement, many contemporary users are prepared to employ such a laborious process for generating video content for subsequent distribution through well-known video sharing platforms such as YouTube, Facebook, and similar social media sharing Internet sites; "YouTube" and "Facebook" are registered trademarks.

The inventors of the present invention have appreciated that a mobile wireless communication device, for example the aforementioned device 10, can be adapted by executing a suitable software application upon its computing hardware 20 to operate in a manner which is technically more user-convenient and generates video content data which is more manageable to edit using the device 10 and more efficient in its use of wireless communication bandwidth when communicated to an external database.

Figure 3:
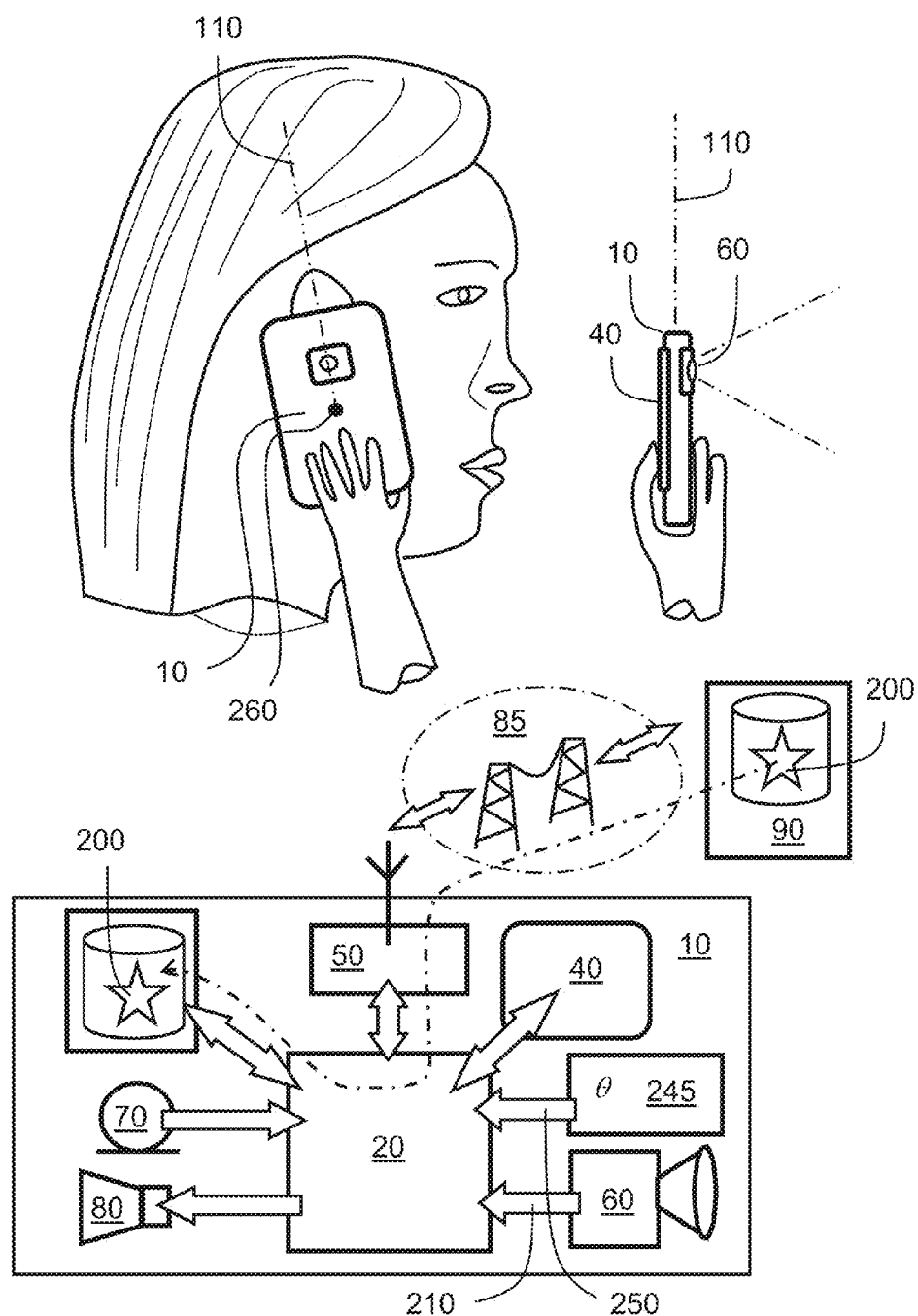
FIG. 3 is an illustration of a contemporary cell phone or tablet computer adapted to implement a camera apparatus pursuant to the present invention.
Figure 4:
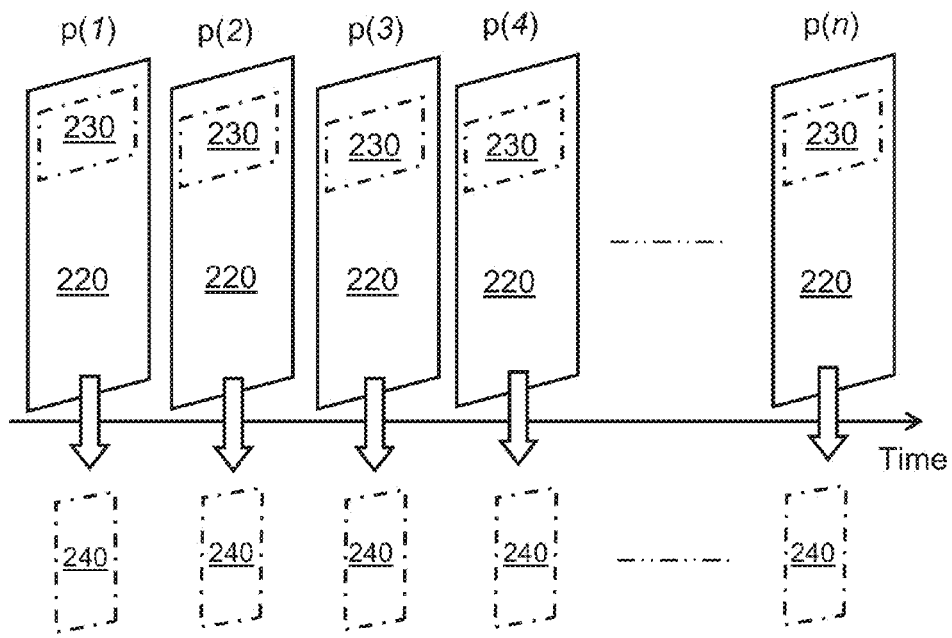
FIG. 4 is an illustration of image field manipulation adopted when implementing the present invention on the contemporary cell phone or tablet computer of FIG. 3.
Figure 4:
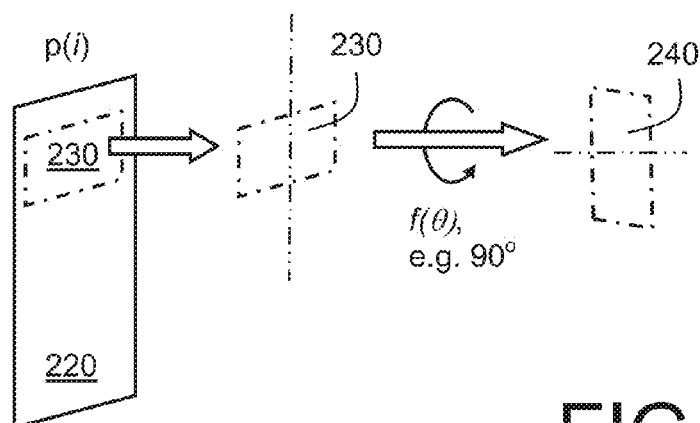

An embodiment of the present invention will now be described as applied to the aforesaid device 10, with reference to FIG. 3. When implementing the present invention, at least one novel software application 200 is downloaded from the external database 90, alternatively already preloaded onto the device 10. The novel software application 200 enables the device 10 to be employed as a camera apparatus for capturing still images and sequences of video images when the device 10 is orientated with its elongate axis 110 in substantially a vertical orientation; in other words, the software application 200 when executed upon the computing hardware 20 coupled to a data memory 30 enables the computing hardware 20 to perform following operations:

(a) to receive a data stream 210 from the optical pixel array sensor 60 corresponding to a temporal sequence of n images 220, denoted by p(1) to p(n), wherein n is an integer;

(b) to select a sub-portion 230 of each image 220 in the sequence of images 220 as illustrated in FIG. 4 to generate a corresponding sequence of sub-images 240; and (c) to process the sequence of sub-images 240 to rotate their orientation as illustrated in FIG. 4 by a compensation angle which is a function f of the angle θ, for example an angle of substantially 90°, to generate a sequence of corresponding rotation-corrected sub-images 240.

Figure 5:
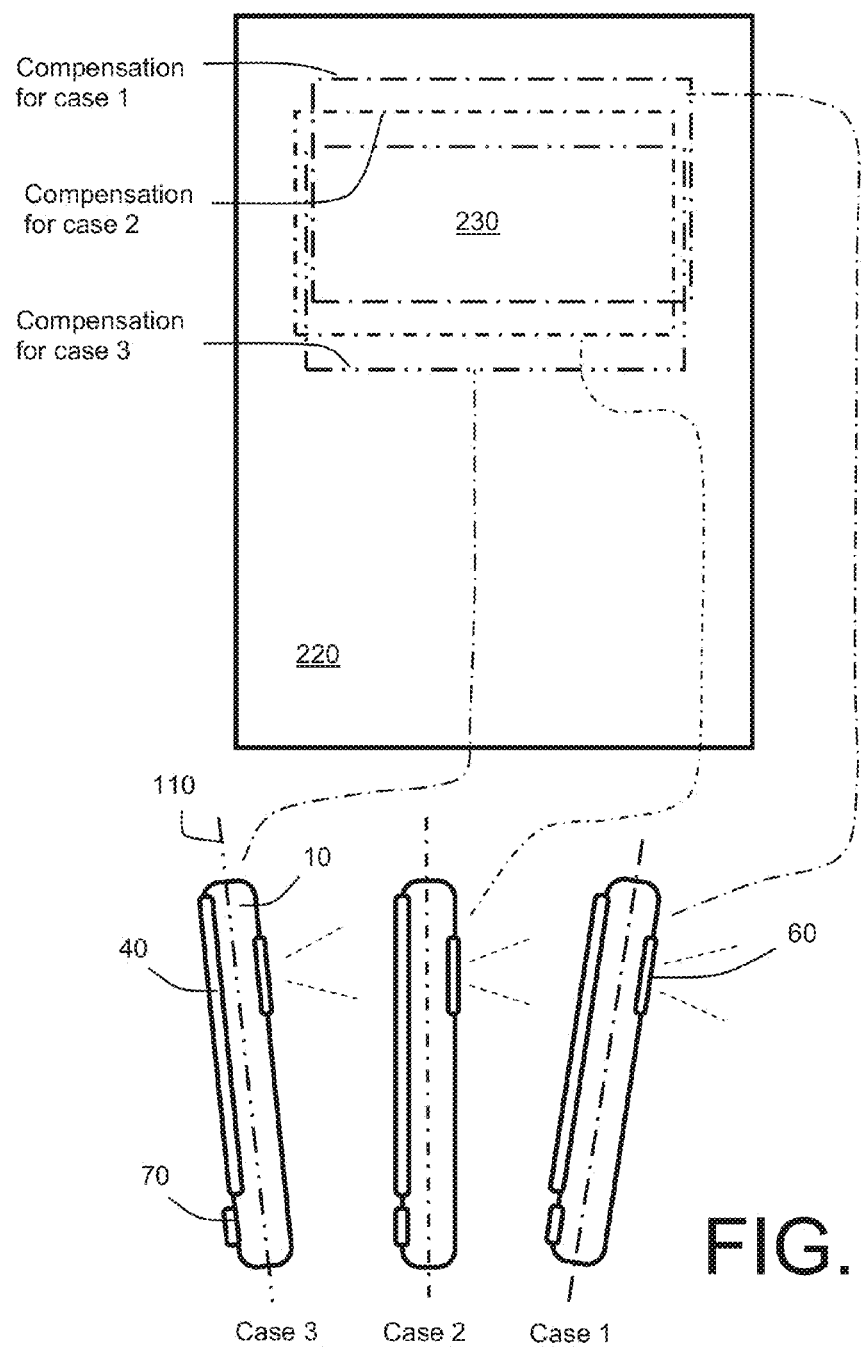
FIG. 5 is an illustration of image stabilization performed on the contemporary cell phone or tablet computer of FIG. 3.

The rotation-corrected sub-images 240 are stored in the data memory 30, optionally together with a copy of the temporal sequence of images 220 being retained in the data memory 30. Optionally, an accelerometer included within the device 10 and coupled to the computing hardware 20 provides an angular signal of an orientation of the elongate axis 110, and the rotation applied in aforesaid step (c) is made a function of the angular signal so that the rotation-corrected sub-images 240 always appear in an upright orientation, despite the user varying an orientation of the device 10 when capturing the video content in the data stream 210. Optionally, the rotation correction applied is substantially 90°, for example in a range of 65° to 115°. Optionally, the angular signal is stored in the data memory 30 for future use, together with the sequence of images 220. Optionally, a gyroscopic sensor 245, for example a Silicon micromachined vibrating structure rotation sensor, is included in the device 10 and coupled to the computing hardware 20 for providing a real-time angular orientation signal 250 indicative of an instantaneous angular orientation of the device 10 about substantially a central point 260 within the device 10; the real-time angular orientation signal 250 is employed by the computing hardware 20 under direction of the software application 200 to adjust a position within the images 220 from where the sub-portions 230 are extracted, as illustrated in FIG. 5, to provide a compensation for any temporally abrupt angular displacement of the device 10 by its user when capturing video content.

Figure 6:
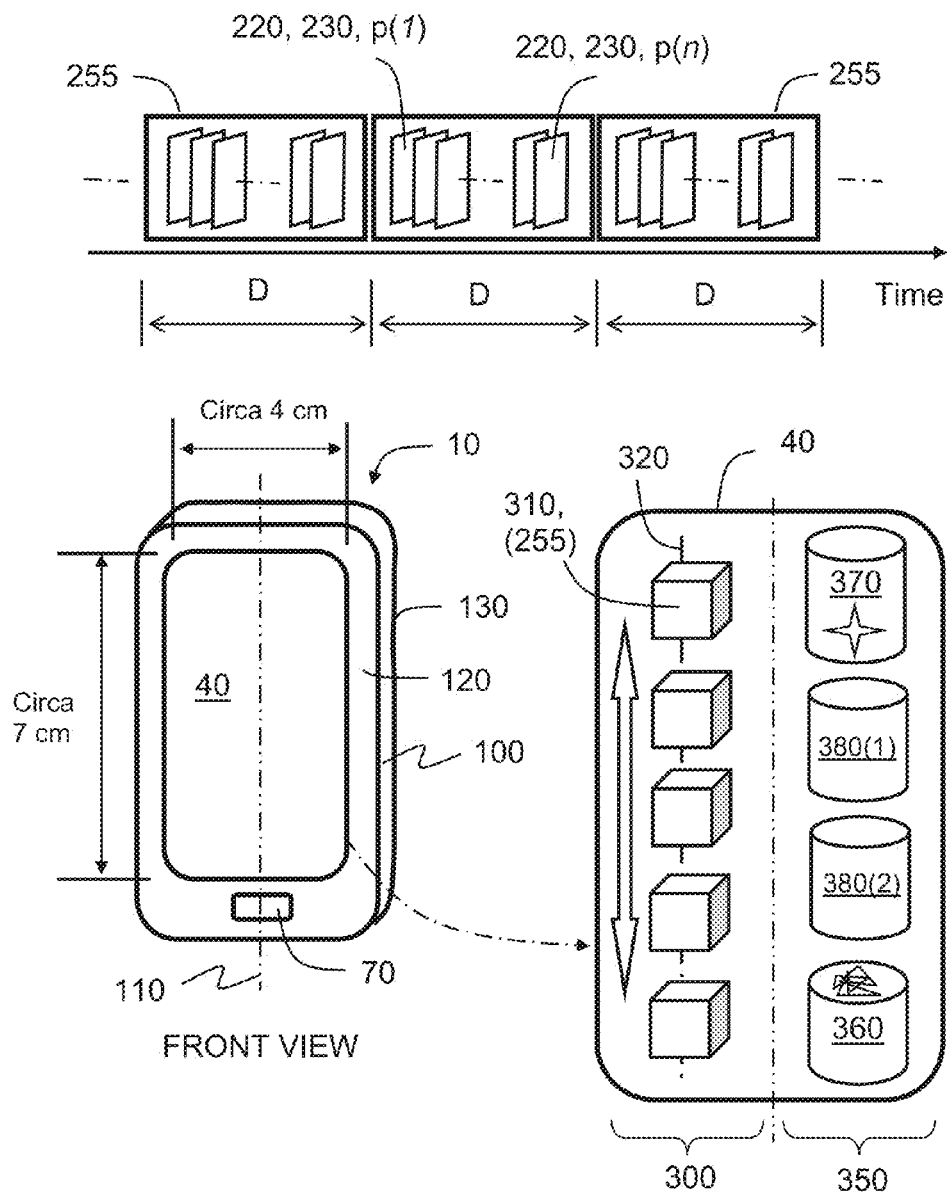
FIG. 6 is an illustration of video clip sorting implemented on the contemporary cell phone or tablet computer of FIG. 3.
Figure 6:
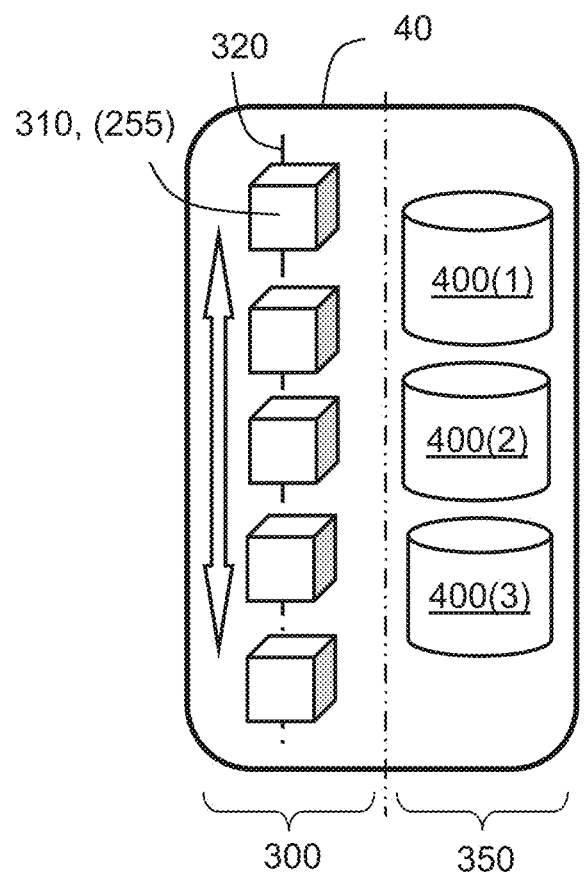

The software application 200 is operable to enable the device 10 to take short clips 255 of video content, for example short clips of defined duration D, for example in a range of 1 second to 20 seconds duration, more optionally in a range of 1 second to 10 seconds duration, and yet more optionally substantially 3 seconds duration. Thus, within the device 10, the data stream 210 is processed as video clips as illustrated in FIG. 6, each clip having a duration D, wherein each video clip is a self-contained data unit; for example, when the video clip is encoded via MPEG, each video clip would have a commencing intra frame (I-frame) with subsequent predicted frames (P-frame) and/or bidirectional frames (B-frame). In an event of a rapid image change within a given video clip, one or more additional I-frames are optionally included later in the given video clip. However, the software application 200 executing upon the device 10 is optionally capable of supporting other types of image encoding alternatively, or in addition, to MPEG encoding, for example JPEG, JPEG2000, PNG, GIF, RLE, Huffman, DPCM and so forth.

The device 10 is conveniently operated, when taking one or more aforesaid video clips, by the user holding the device 10 in one of his/her hands, with the elongate axis 110 in a substantially vertical direction, with the optical pixel array sensor 60 pointing in a direction away from the user, with the touch-screen graphical user interface 40 facing towards the user being provided, via execution of the aforesaid software application upon the computing hardware 20, with an active area corresponding to a "record button", for example optionally shown as a region of the touch-screen graphical user interface 40 presented in red color. The device 10 then optionally operates such that:

(a) depressing the record button for a short instance causes the device to capture one video clip of duration D, for example substantially 3 seconds duration; and
(b) maintaining the record button depressed continuously causes the device 10 to capture a temporally concatenated sequence of video clips of duration D, for example substantially 3 seconds duration, until the user ceases to depress the record button.

Such a manner of operation encourages the user to take short series of video clips of subject matter which is specifically of interest. Moreover, it also encourages the user to take short single clips of events. By enabling the device 10 to capture images and/or video clips with the device 10 in an orientation with its elongate axis in substantially vertical direction renders the user and the device 10 in a posture for undertaking a customary telephone conversation; this enables the user to capture video content in an unobtrusive manner, whilst appearing to be undertaking a telephone conversation, thereby enabling scenes to be captured by the device 10 in a less imposing and natural manner and potentially resulting in more interesting video content being generated.

The aforesaid video clips recorded in the data memory 30 soon occupy considerable memory capacity therein, especially if the user elects to keep both data corresponding to the data stream 210 as well as data corresponding to the rotation-corrected sub-images 240. Optionally, initially, merely the data stream 210 is recorded in the data memory 30 together with rotational angle data pertaining to the device 10 at a time when the one or more video clips and/or still images were captured, with the rotation-corrected sub-images 240 being subsequently generated after capture of the data stream 210. When the device 10 is operated, when executing the software application 200, to capture still images, the record button functions in a manner akin to a conventional camera shutter button, namely an image is capture at an instance the record button is depressed by the user.

The data volume associated with one or more video clips stored in the data memory 30 can become considerable, such that it is desirable for the software application 200 when executed upon the computing hardware 20 to provide the user with an opportunity to review the video clips to decide which to retain and which to discard. In view of the touch-screen graphical user interface 40 being of rather limited area relative to a screen area of a lap-top computer or desk-top computer, the software application 200 is arranged to cause the computing hardware 20 to function in a radically different manner in comparison to known contemporary video content manipulation software employed in lap-top computer or desk-top computers.

Referring to FIG. 6, the touch-screen graphical user interface 40 is relatively small in area, for example 4 cm×7 cm in spatial extent. People with poorer eyesight, for example more mature users, are often not able to distinguish fine detail on the touch-screen graphical user interface 40, despite it being technically feasible to provide the interface 40 with a high pixel resolution by microfabrication processes. However, the user interface 40 is capable of supporting, in conjunction with the software application 200, tapping and swiping motions of the user's fingers for instruction input purposes to the computing hardware 20. Such tapping and swiping motions are clearly distinguished from click-and-drag motions customarily employed in conventional video editing software executable upon lap-top and desk-top personal computers.

In FIG. 6, after capture of a series of video clips has been executed, for example individual temporally isolated video clips or temporally concatenated sequences of video clips, the software application 200 executed upon the computing hardware 20 provides an editing mode of operation which the user employs with the user interface 40 facing towards the user. Optionally, an elongate dimension of the user interface 40 is arranged to be top-bottom, and a transverse dimension of the user interface is arranged be left-right as observed by the user. On a left-hand portion 300 of the user interface 40, the software application 200 executing upon the computing hardware 20 is operable to present a sequence of captured video clips as miniature icons 310 along an axis 320 from top to bottom. The video clips shown by the icons 310 are optionally presented in a temporal sequence in an order in which they were captured by the device 10. The user is able to scroll up and down the icons by way of a finger swiping motion applied to the user interface 40. Moreover, the user is able to view a given video clip by tapping upon a corresponding icon 310 displayed along the axis 320.

On a right-hand portion 350 of the user interface 40, there are presented icons corresponding to a plurality of primary sorting "bins", for example a "trash bin" 360, a "best video clip bin" 370 and one or more "moderate interest bins" 380, for example two moderate interest bins 380(1), 380(2). Beneficially the "best video clip bin" 370 is spatially remote in the right-hand portion 350 relative to the "trash bin" 360 as illustrated in FIG. 6, with the one or more "moderate interest bins" 380 interposed therebetween. When sorting the video clips represented by the icons 310 along the axis 320, the user positions his/her finger or thumb over a given icon 310 of a given video clip to be sorted and then swipes the icons 310 into a bin desired by the user. For example, video clips that are not to be retained in the data memory 30 are selected for deletion by the user swiping icons 310 corresponding to the video clips towards the "trash bin" 360. Moreover, video clips that are definitely to be retained in the data memory 30 are selected for keeping by the user swiping icons 310 corresponding to the video clips towards the "best video clip bin" 370. Furthermore, video clips that are to be retained, at least in a short term, in the data memory 30 are selected for intermediate storage by the user swiping icons 310 corresponding to the video clips towards the one or more "moderate interest bins" 380. The more "moderate interest bins" 380 are optionally susceptible to be given names chosen, and thus meaningful to, the user. When the icons 310 have been sorted along the axis 210, the user can invoke, for example by a finger or thumb tapping action, an "empty trash bin" icon on the user interface 40 to delete the video clips sorted by the user into the "trash bin" 360, to free space in the data memory 30 for receiving future video clips.

Optionally, the software application 200 provides a secondary sorting function, wherein the user invokes a given primary bin from the right-hand portion 350 by a finger or thumb tapping action. Such an action causes the user interface 40 to switch to a secondary mode, wherein the video clips within the given primary bin appear along the axis 320 in the left-hand portion 300 of the user interface 40. Moreover, one or more secondary bins 400, for example three secondary bins 400(1), 400(2), 400(3), are presented in the right-hand portion 350, enabling the user by way of a swiping action as aforementioned to sort the contents of the given primary bin into one or more of the presented secondary bins 400 presented in the right-hand portion 350. Tertiary and higher order sorting of video clips into tertiary and higher order bins via swiping actions executed by the given user on the user interface 40 is optionally supported by the software application 200 executing upon the computing hardware 20 of the device 10.

Figure 7:
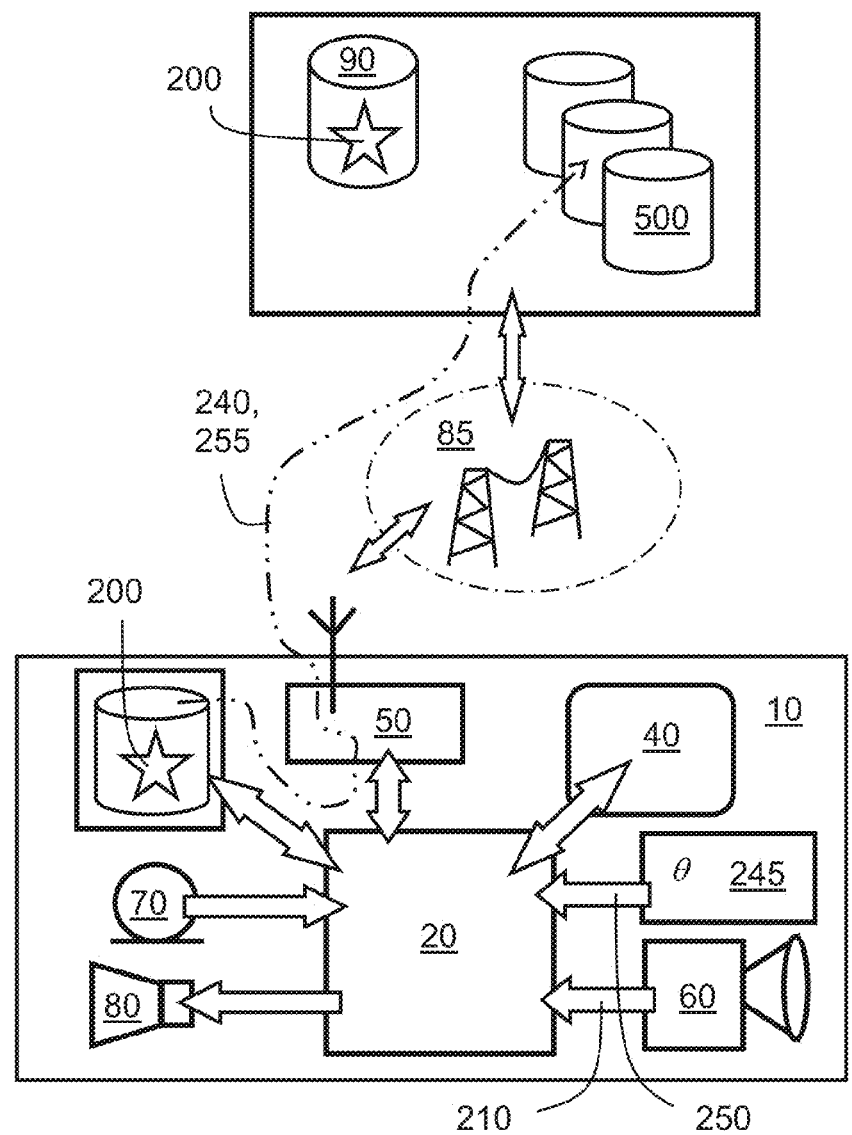
FIG. 7 is an illustration of video clip uploading from the contemporary cell phone or tablet computer of FIG. 3 to an external proxy database.

Referring next to FIG. 7, the software application 200 executing upon the computing hardware 20 is operable to enable the user to upload one or more video clips sorted into one or more bins to be retained by communicating data corresponding to the one or more video clips via wireless through the wireless communication interface 50 to one or more remote proxy servers 500. Optionally, the software application 200 enables the device 10 to be used to manipulate the uploaded data clips on the one or more remote proxy servers 500, for example to assemble the uploaded video clips into a composite video creation to which additional sound effects, additional sound tracks, additional video effects can be added, prior to the composite video creation being broadcast via social media, for example via YouTube, Facebook or similar. When video editing of the uploaded one or more video clips is executed at the one or more proxy servers 500, only relatively small data flows associated with user instructions are communicated via the device 10 to the one or more proxy servers 500. The user is optionally allowed to include into the composite video creation one or more video clips that the user has earlier uploaded to the one or more proxy servers 500, as well as authorized third-party video clips and sound tracks, for example music tracks; these authorized third-party video cups and sound tracks, as well as the user's earlier uploaded video clips, are beneficially represented by thumbnail icons on the user interface 40, thereby avoiding a need to download complete data corresponding to the authorized third-party video clips and sound tracks, as well as the user's earlier uploaded video clips, to the device 10.

Optionally, when uploading video clips from the device 10 to the one or more proxy servers 500, either the rotation-corrected sub-images 240 or data corresponding to the data stream 210 giving rise to the rotation-corrected sub-images 240, or both, are uploaded; the user is optionally provided with an option which to choose depending upon whether or not there is a need for the user to revert back to the data corresponding to the original data stream 210. Clearly, uploading the rotation-corrected sub-images 240 only requires less transfer of data and is hence faster and/or less demanding in available wireless data communication capacity.

The invention is capable of providing numerous benefits to the user. The software application 200 executing upon the computing hardware 20 of the device 10 is operable to capture data from one or more sensors in a more convenient manner, thereafter to provide the user with an environment in which to perform various processing operations on the captured data despite the device 10 having a relatively smaller graphical user interface 40, and then communicated resulting processed data to one or more proxy servers 500 via wireless or direct wire and/or optical fibre communication connection. Such wire and/or optical fibre communication is beneficially achieved by way of the device 10 communicating via near-field wireless communication to a communication node in close spatial proximity to the device 10, where the communication node has a direct physical connection to a communication network, for example the Internet; such near-field wireless communication can, for example be performed, by the user, after capturing video clips, placing the device 10 in close proximity with a lap-top computer or desk-top computer also equipped with near-field wireless communication, for example conforming to BlueTooth or similar communication standard. "BlueTooth" is a registered trademark.

As aforementioned, the device 10 is beneficially a contemporary wireless smart phone or tablet computer, for example a standard mass-produced item, which is adapted by executing the software application 200 thereupon, to implement the present invention. The software application 200 is beneficially implemented as an "App" which can be downloaded from an "App store", namely external database, else provided preloaded into the smart phone at its initial purchase by the user.

Figure 8:
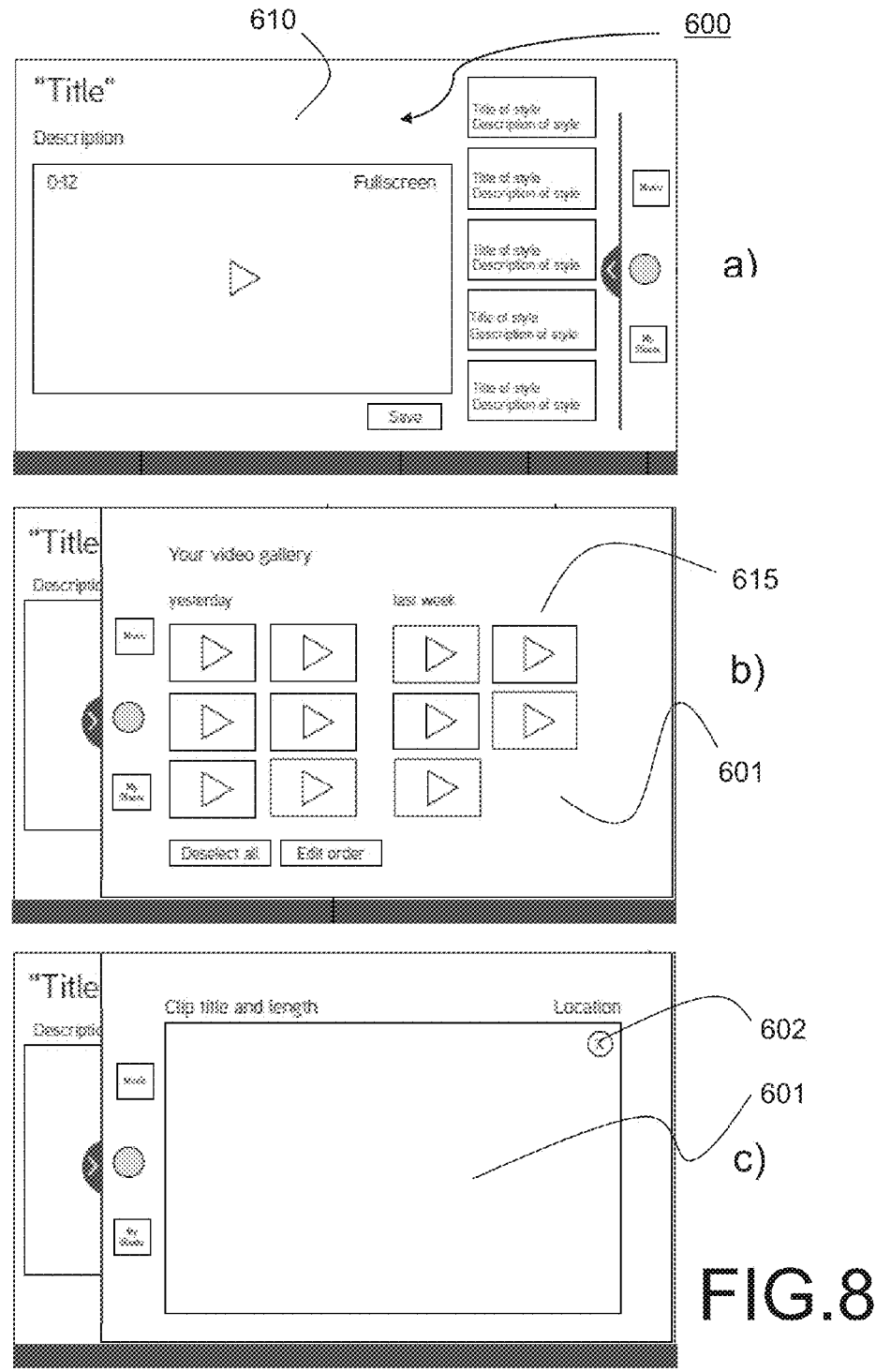
FIG. 8 is an illustration of steps involved when generating a video clip using a contemporary cell phone and/or tablet computer (a, b, c, d, e, f, g, h).
Figure 8:
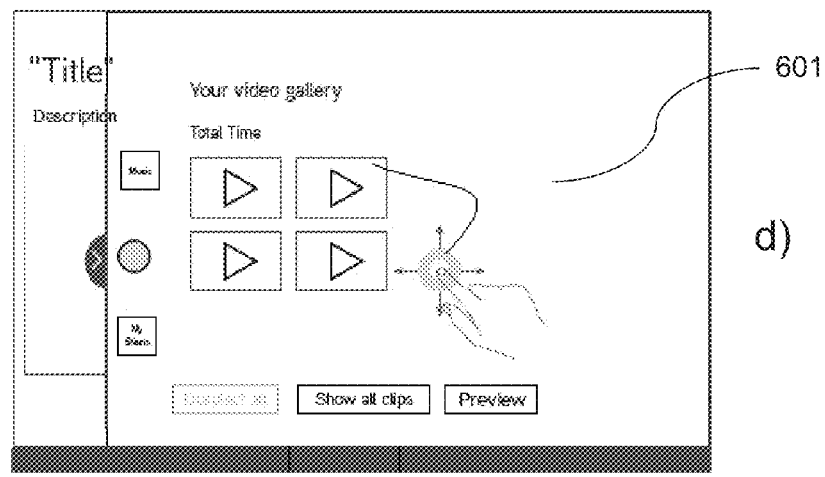
Figure 8:
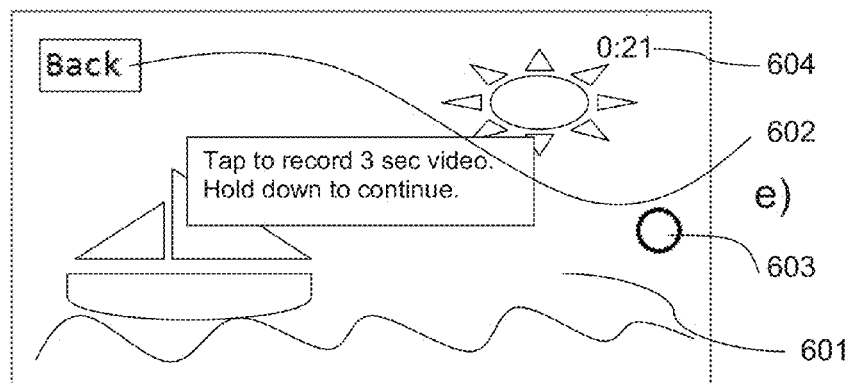
Figure 8:
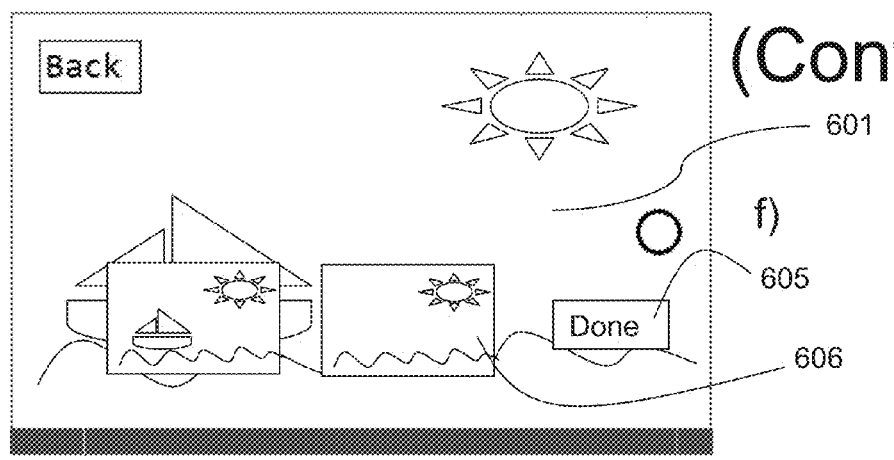
Figure 8:
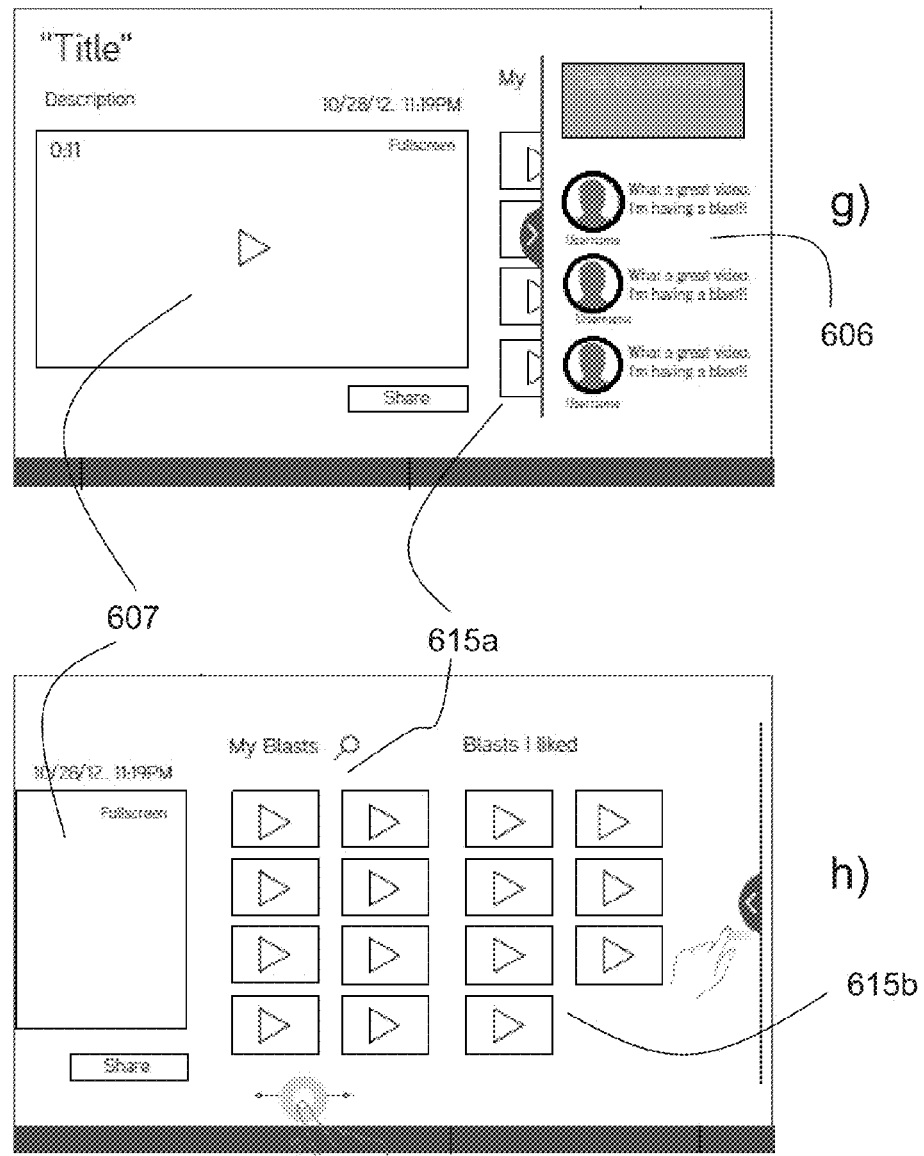

In FIG. 8, there is shown an embodiment of the software application 200 implemented as an "App" 600, wherein the "App" 600 is executed upon computing hardware of the device 10 for compiling an overall main video clip, also conveniently referred to as being a "blast", and then produce it using a main edit screen. In FIG. 8a, a main edit screen 610 is shown for overlaying the video clip with selected options for style, music or new additions such as colours. In FIG. 8b, there is shown one example layout of a library 615 of videos from different times. By selecting different options on a display 601 generated by the App 600, it is possible to navigate through different screens providing editing functionality during video production steps. In FIG. 8c, there is shown a manner in which a video clip in the library, shown as 615 in FIG. 8b, is selected which is played in a substantially central position of the display 601, where a back to library button 602 is also shown. In FIG. 8d, there is shown an editing order and pop-up of the one or more recorded video clips. It is possible to press or tap any one of the video clips to preview them. The user can also drag and drop the clip into the edit order arrangement shown in the display 601. This allows for quick and efficient editing of the play order of the video clips that the user is incorporating to build the main video clip. In FIG. 8e and FIG. 8f, there is shown the recording screen, wherein the display 601 has a back button 602, a record button 603; the screen enables entry of instructions, for example "Tap once to record a 3 second video clip. Hold down to continue recording."

shown on the display 601. During taking of the recording, a counter ideally appears at a top right hand corner of the display 601. Video clips recorded are displayed in a forefront 605 of the display 601 allowing the user to see what has been recorded while continuously adding more video clips, for example when needed or on-the-run. Furthermore, a "Done button" 606 is also shown in the display 601 of the recording screen. In FIGS. 8g and 8h, there is shown the users video clip screen "My blast screen" where a video clip can be viewed, posted onto multimedia sites, for example YouTube, Turnblr, Vimeo, Facebook, (which are all registered trademarks) or similar to be commented on by the user and others in a comment area 606, or as a combined screen with a video screen 607, a library 615a of own video clips (namely "blasts") and other video clips 615b which are liked by the user. Further it is seen in FIG. 8 that the App 600 can be used with the device 10 held in a landscape position, with its longitudinal axis about horizontally, when using the functionality. Similarly the App 600 also works when the device 10 is rotated into a portrait position, with its longitudinal axis held about vertically or at a slight angle as described earlier, if the user prefers this.

In one embodiment, the user utilises the camera of the device 10, which can be a cellular phone or tablet computer, to record the clip which is then edited using the software, namely in the form of the App 600. The clip, after it has been edited, may be shared on a TV screen (for example via an AppleTV, "Apple" is a registered trademark), a social media site, or sent to other devices for viewing or further editing. It is also possible that a group of users collaborate when producing the video clip allowing multiple locations to be captured simultaneously and also edited more efficiently. One user can have the device 10 as the key editing device, for example using a tablet computer, while multiple devices 10, for example cellular phones are capturing the video clips, which are sent to the key editing device. This allows for video clips to be generated using multiple sources of, for example pre-recorded content, live streaming or feeds of clips, and to be output to one or more devices simultaneously over operating platforms such as Android, iOS, Windows8, (which are all registered trademarks) or similar to name some examples, over home entertainment systems and other communication networks. It would also be possible that one key device 10 is used to control when a given recording is completed by one or more of the other devices 10. The key recording device 10 may be used as the key editing device for some or all of the editing or not at all. This provides major opportunities for generating use or location-specific video clips in multiple locations using multiple devices 10. When one device 10 is used to receive data from multiple other devices 10, thereby providing back end control, wherein the devices 10 collectively operate in a spoke-and-hub model for recording and/or editing, thereby making the video production process more efficient and also more diverse in location, by way of editing input and collaboration between users.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

We claim:

1. A camera apparatus including a wireless communication device (10) incorporating computing hardware (20) coupled to a data memory (30), to a wireless communication interface (50) for communicating data from and to the wireless communication device (10), to a graphical user interface (40) for receiving user input, and to an optical imaging sensor (60) for receiving captured image data therefrom, wherein the computing hardware (10) is operable to execute one or more software applications (200) for enabling the optical imaging sensor (60) to capture one or more images, and for storing corresponding image data in the data memory (30) and/or for communicating the corresponding image data from the wireless communication device (10) via its wireless communication interface (50), wherein the wireless communication device (10) has an elongate external enclosure having a longest dimension (L) defining a direction of a corresponding elongate axis (110) for the wireless communication device (10), and wherein:

(a) the one or more software applications (200) are operable to enable the wireless communication device (10) to capture images when the wireless communication device (10) is operated by its user such that the elongate axis (110) is orientated in substantially an upward direction, wherein the one or more software applications (200) are operable to cause the computing hardware (20) to select sub-portions of captured images provided from the optical imaging sensor (60) and to generate corresponding rotated versions of the selected sub-portions to generate image data for storing in the data memory (30) and/or for communicating via the wireless communication interface (50); and (b) the one or more software applications (200) are operable to enable the wireless communication device (10) to capture the one or more images as one or more video clips (255) in response to the user providing tactile input at an active region the graphical user interface (40), wherein each video clip (255) is of short duration (D) and is a self-contained temporal sequence of images.

2. The camera apparatus as claimed in claim 1, wherein the short duration (D) is in a range of 1 second to 20 seconds, more preferable in a range of 1 second to 10 seconds, and most preferable substantially 3 seconds.

3. The camera apparatus as claimed in claim 1, wherein the wireless communication device (10) includes a sensor arrangement (245) for sensing an angular orientation of the elongate axis (110) of the wireless communication device (10) and for generating a corresponding angle indicative signal (250), and the one or more software applications (200) are operable to cause the computing hardware (20) to receive the angle indicative signal (250) and to rotate the sub-portions (230) of the captured images (220) so that they appear when viewed to be upright and stable images (240).

4. The camera apparatus as claimed in claim 1, wherein the one or more software applications (200) are operable when executed upon the computing hardware (20) to present one or more icons (310) representative of video clips upon the graphical user interface (40), and one or more icons (360, 370, 380) representative of sorting bins into which the one or more icons (310) representative of video clips are susceptible to being sorted, wherein sorting of the one or more icons (310) representative of video clips into the one or more icons (360, 370, 380) representative of sorting bins in invoked by a user swiping motion executed by a thumb or finger of the user on the user graphical interface (40), wherein a given icon representative (310) of a corresponding video clip is defined at a beginning of the swiping motion and a destination sorting bin (370, 380, 390) for the selected icon (310) representative of a corresponding video clip is defined at an end of the swiping motion.

5. The camera apparatus as claimed in claim 4, wherein the one or more software applications (200) executing upon the computing hardware (20) are operable to cause the one or more icons (310) representative of video clips upon the graphical user interface (40) to be sorted to be presented in a scrollable array along a longest length dimension (320) of the graphical user interface (40).

6. The camera apparatus as claimed in claim 5, wherein the one or more software applications (200) executing upon the computing hardware (20) are operable to cause the one or more icons (310) representative of video clips upon the graphical user interface (40) to be sorted to be presented in a spatial arrangement indicative of a time at which the video clips were captured by the optical imaging sensor (60).

7. The camera apparatus as claimed in claim 4, wherein at least one of the one or more icons (360, 370, 380) representative of sorting bins, into which the one or more icons (310) representative of video clips are susceptible to being sorted, is a trash bin (360), wherein the computing hardware (20) is operable is present the user with a graphical representation option for emptying the trash bin (360) to cause data stored in the data memory (30) corresponding to contents of the trash bin (360) to be deleted for freeing data memory capacity of the data memory (30).

8. The camera apparatus as claimed in claim 1, wherein the one or more software applications (200) are operable when executed upon the computing hardware (20) to enable the wireless communication device (10) to upload one or more video clips from the data memory (20) to one or more remote proxy servers (500) and to manipulate the one or more video clips uploaded to the one or more proxy servers (500) via user instructions entered via the user graphical interface (40).

9. The camera apparatus as claimed in claim 1, wherein the one or more software applications (200) are operable when executed upon the computing hardware (20) to allows for two or more wireless communication devices (10) to be used for the recording and/or editing of the video clips in a spoke-and-hub model.

10. A method of implementing a camera apparatus using a wireless communication device (10) incorporating computing hardware (20) coupled to a data memory (30), to a wireless communication interface (50) for communicating data from and to the wireless communication device (10), to a graphical user interface (40) for receiving user input, and to an optical imaging sensor (60) for receiving captured image data therefrom, wherein the computing hardware (10) is operable to execute one or more software applications (200) for enabling the optical imaging sensor (60) to capture one or more images, and for storing corresponding image data in the data memory (30) and/or for communicating the corresponding image data from the wireless communication device (10) via its wireless communication interface (50), wherein the wireless communication device (10) has an elongate external enclosure having a longest dimension (L) defining a direction of a corresponding elongate axis (110) for the wireless communication device (10), and wherein the method further includes:

(a) employing the one or more software applications (200) to enable the wireless communication device (10) to capture images when the wireless communication device (10) is operated by its user such that the elongate axis (110) is orientated in substantially an upward direction, wherein the one or more software applications (200) are employed to cause the computing hardware (20) to select sub-portions (230) of captured images (220) provided from the optical imaging sensor (60) and to generate corresponding rotated versions (240) of the selected sub-portions to generate image data for storing in the data memory (30) and/or for communicating via the wireless communication interface (50); and (b) employing the one or more software applications (200) to enable the wireless communication device (10) to capture the one or more images as one or more video clips (255) in response to the user providing tactile input at an active region the graphical user interface (40), wherein each video clip (255) is of short duration (D) and is a self-contained temporal sequence of images.

11. The method as claimed in claim 10, wherein the short duration (D) is in a range of 1 second to 20 seconds, more preferable in a range of 1 second to 10 seconds, and most preferable substantially 3 seconds.

12. The method as claimed in claim 10, wherein the method includes using a sensor arrangement (245) of the wireless communication device (10) for sensing an angular orientation of the elongate axis (110) of the wireless communication device (10) and generating a corresponding angle indicative signal (250), and employing the one or more software applications (200) to cause the computing hardware (20) to receive the angle indicative signal (250) and to rotate the sub-portions (230) of the captured images so that they appear when viewed to be upright and stable images (240).

13. The method as claimed in claim 10, wherein the method includes employing the one or more software applications (200) when executed upon the computing hardware (20) to present one or more icons (310) representative of video clips upon the graphical user interface (40), and one or more icons (360, 370, 380) representative of sorting bins into which the one or more icons representative (310) of video clips are susceptible to being sorted, wherein sorting of the one or more icons (310) representative of video clips into the one or more icons (360, 370, 380) representative of sorting bins in invoked by a user swiping motion executed by a thumb or finger of the user on the user graphical interface (40), wherein a given icon (310) representative of a corresponding video clip is defined at a beginning of the swiping motion and a destination sorting bin (360, 370, 380) for the selected icon representative of a corresponding video clip is defined at an end of the swiping motion.

14. The method as claimed in claim 12, wherein the method includes employing the one or more software applications (200) executing upon the computing hardware (20) to cause the one or more icons (310) representative of video clips upon the graphical user interface (40) to be sorted to be presented in a scrollable array along a longest length dimension (320) of the graphical user interface (40).

15. The method as claimed in claim 13, wherein the method includes employing the one or more software applications (200) executing upon the computing hardware (20) to cause the one or more icons (310) representative of video clips upon the graphical user interface (40) to be sorted to be presented in a spatial arrangement indicative of a time at which the video clips were captured by the optical imaging sensor (60).

16. The method as claimed in claim 12, wherein the method includes employing the one or more software applications (200) to cause the at least one of the one or more icons (360, 370, 380) representative of sorting bins, into which the one or more icons (310) representative of video clips are susceptible to being sorted, to be a trash bin (360), wherein the computing hardware (20) is operable is present the user with a graphical representation option for emptying the trash bin to cause data stored in the data memory (30) corresponding to contents of the trash bin to be deleted for freeing data memory capacity of the data memory (30).

17. The method as claimed in claim 10, wherein the method includes employing the one or more software applications (200) when executed upon the computing hardware (20) to enable the wireless communication device (10) to upload one or more video clips from the data memory (20) to one or more remote proxy servers (500) and to manipulate the one or more video clips uploaded to the one or more proxy servers (500) via user instructions entered via the user graphical interface (40).

18. A software product (200) recorded on machine-readable data storage media, wherein the software product is executable upon computing hardware (20) for implementing the method as claimed in claim 10.

19. The software product as claimed in claim 17, wherein the software product (200) is downloadable from an App store (90) to a wireless communication device (10) including the computing hardware (20).

* * * * *